INVENTOR
PAUL L. F. GABORIAUD

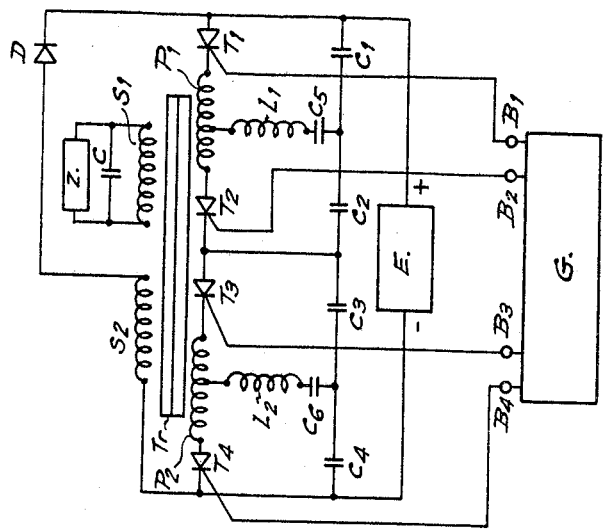

BY Woodhams, Blanchard & Flynn
ATTORNEYS

United States Patent Office 3,480,850
Patented Nov. 25, 1969

3,480,850
THYRISTOR INVERTER
Paul L. F. Gaboriaud, Issy-les-Moulineaux, France, assignor of one-half to Societe Alsacienne d'Etudes et de Travaux (Socaltra), Neuilly-sur-Seine, Hauts-de-Seine, France, a corporation of France
Filed May 14, 1968, Ser. No. 729,059
Claims priority, application France, May 16, 1967, 106,416
Int. Cl. H02m 5/14, 5/16, 5/30
U.S. Cl. 321—7                                6 Claims

ABSTRACT OF THE DISCLOSURE

A thyristor inverter having $p$ stages connected in series with the primary winding of an output transformer. Each stage is supplied from the same direct-current power source by means of a capacitive voltage divider having a division ratio equal to $p$. A drive circuit generates $p$ polyphase signals having a frequency $N/p$ which are respectively applied to the control electrodes of each stage, said drive signals being successively phase-shifted relative to each other by a quantity equal to $1/N$.

---

This invention relate to a thyristor inverter of the polyphase excitation type and comprising an output transformer at whose secondary winding is collected a signal having a frequency N.

In the case of known thyristor inverter circuits, it is very difficult at the present time to obtain high power outputs at high frequencies, e.g., more than 1 kw. at a frequency of the order of 15 kc./s. In fact, thyristors are primarily limited in frequency by their relatively long overlap time.

In order to obtain a high frequency N by means of thyristors, it is possible, for example, to utilize the so-called "polyphase excitation" technique. This technique consists in grouping together a predetermined number $p$ of thyristors and in applying respectively to the control electrode of said thyristors $p$ polyphase drive signals formed of pulses having a recurrence frequency which is equal to $N/p$. Moreover, said drive signals must be successively phase-shifted relative to each other by a same quantity equal to $1/N$, that is to say the period of repetition of the pulses of each drive signal divided by the number $p$.

Under these conditions, the current pulses developed by the thryristors follow each other with a repetition period equal to $1/N$, namely a frequency N. The frequency of the signal which is collected at the terminals of the secondary winding of the output transformer of the inverter is therefore equal to N whereas each thyristor operates only at a submultiple frequency which is equal to $N/p$. The technique of polyphase excitation therefore permits a frequency multiplication by a factor which is equal to the number of phases of the polyphase drive signals.

As is readily apparent, each thyristor can be replaced by a stage comprising a plurality of thyristors connected in series or in parallel, but all of the thyristors constituting one stage are then excited in phase by the same drive signal.

However, thyristors are also highly sensitive to overvoltages and it is therefore preferable for safety reasons to reduce the voltage supplied thereto. For this reason, the circuits for supplying direct-current power to thyristor inverters are highly complicated and must in the majority of cases comprise transformers, the cost price and overall size of which impose considerable limitations on the available output power of inverters of this type.

The primary object of this invention is to overcome the disadvantage referred to above and is accordingly directed to a thyristor inverter of the type aforesaid which essentially comprises $p$ thyristor stages connected in series with the primary winding of the output transformer and each supplied from the same direct-current power source by means of a capacitive voltage divider having a division ratio equal to $p$, and a drive circuit which generates $p$ polyphase signals having a frequency $N/p$ and respectively applied to the control electrodes of the thyristors of each stage, said drive signals being in addition successively phase-shifted relative to each other by a same quantity equal to $1/N$.

By virtue of this arrangement, each thyristor or stage of thyristors can be supplied with a voltage of low value compared with the voltage of the power source and therefore exhibits good stability as well as high reliability of operation. As a particular consequence, the inverter can be directly supplied with the mains current which has simply been rectified, which is a particularly convenient and inexpensive solution. An inverter of this type therefore makes it possible to obtain high power outputs at high frequencies, whereas each thyristor or thyristor stage operates with high reliability at a low frequency which is a submultiple of the output frequency and at low power.

In a particular application to an inverter in which the number of thyristor stages is equal to 4 or to a multiple of 4 in a geometrical progression having a common ratio of 2, the drive circuit comprises a control stage which delivers two symmetrical square-wave signals having a frequency $N/2$ applied respectively to two scale-of-two bistable devices having symmetrical outputs, the four four-phase signals thus produced being intended to drive in turn four other identical bistable multivibrators and so forth in sequence until the number of polyphase signals produced is equal to the number of stages of thyristors of the inverter.

A drive circuit of this type is particularly well suited to the inverter according to the invention since it is thus possible to obtain a large number of polyphase signals both in a simple manner and at low cost, provided that the number of signals is a multiple of 4 in a geometrical progression having a common ratio of 2.

In a particular embodiment of the invention, the control stage is constituted by a symmetrical astable multivibrator having a frequency $N/2$ and advantageously synchronized by a control oscillator having the same frequency or a multiple frequency.

In an alternative embodiment, the control stage is constituted by a bistable device having symmetrical outputs and driven by a control oscillator having a frequency $N/2$.

In another alternative embodiment, the control stage is constituted by a scale-of-two bistable device having symmetrical outputs and driven by the pulses of an oscillator having a frequency N.

A clear understanding of the invention will in any case be gained from the following description, reference being made to the accompanying drawings in which one embodiment is given by way of nonlimitative example, and in which:

FIG. 1 is a partially schematic diagram of a thyristor inverter according to the present invention in the four-phase application thereof;

FIG. 2 is a diagram of the four-phase drive signals of said inverter;

Figure 4:
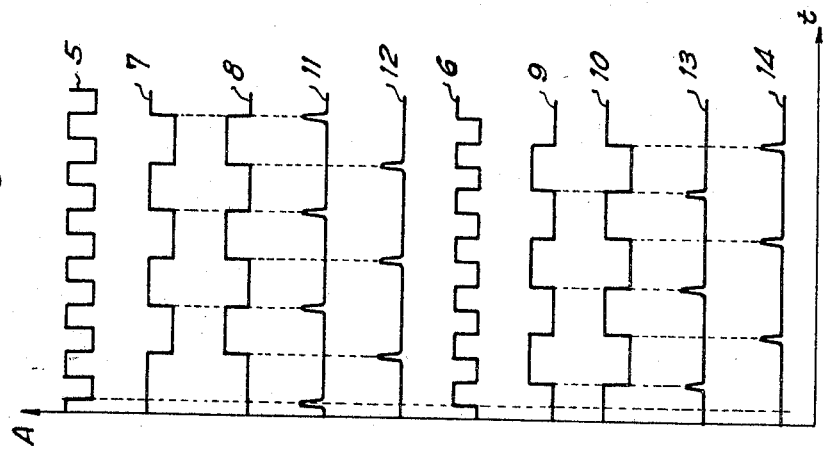
FIG. 4 is a diagram of the signals which are collected at different points of the diagram of FIG. 3.

The inverter which is illustrated in FIG. 1 is designed to operate with four-phase excitation and accordingly comprises four thyristors $T_1$, $T_2$, $T_3$ and $T_4$ which are connected in series with the two half primary windings at the midpoint $P_1$ and $P_2$ of a single-output transformer $Tr$, $P_1$ being connected between $T_1$ and $T_2$, and $P_2$ being connected between $T_3$ and $T_4$. The secondary winding $S_1$ of said transformer is connected to a load impedance Z and is tuned to the desired output frequency N by means of a parallel-connected tuning capacitor C.

The four thyristors $T_1$, $T_2$, $T_3$ and $T_4$ are supplied in series from a single direct-current power source E by means of a capacitive voltage divider comprising four identical capacitors $C_1$, $C_2$, $C_3$ and $C_4$ having a high capacitance and connected in series to the terminals of the supply source E. The point of junction of $C_1$ with $C_2$ is connected to the mid-point of the primary winding $P_1$ via a tuning inductance coil $L_1$ in series with a tuning capacitor $C_5$ while the point of junction of $C_3$ with $C_4$ is connected to the midpoint of the primary winding $P_2$ via a tuning inductance coil $L_2$ in series with a tuning capacitor $C_6$. These two assemblies $L_1$–$C_5$ and $L_2$–$C_6$ constitute series resonance circuits and are tuned to the same frequency $N/2$, that is to say one-half of the output frequency. In regard to the point of junction of $C_2$ with $C_3$, it is connected directly to the point of junction of the thyristor $T_2$ with the thyristor $T_3$. Thus, each capacitor $C_1$, $C_2$, $C_3$ or $C_4$ can be assimilated with a voltage source having a value $V/4$ which supplies the corresponding thyristor $T_1$, $T_2$, $T_3$ or $T_4$, the value of the terminal voltage of the supply source E being designated as V.

The control electrodes of the four thyristors $T_1$, $T_2$, $T_3$ and $T_4$ are respectively connected to the four output terminals $B_1$, $B_2$, $B_3$ and $B_4$ of a drive circuit G which supplies the polyphase excitation of the inverter. Said circuit G is in fact so designed that the four-phase drive signals 1, 2, 3 and 4 which are shown in the diagram of FIG. 2 are developed respectively at the four output terminals referred-to as a function of their amplitude A and of the time $t$. Eash drive signal is formed of pulses having a recurrence frequency equal to $N/4$ and therefore having a repetition period $T=4/N$. Moreover, said drive signals are successively phase-shifted to each other by a same quantity which is equal to $T/4$, namely $1/N$.

The output transformer $Tr$ of the inverter has in addition an auxiliary secondary winding $S_2$ which is connected to the terminals of the supply source E in series with a diode D. Said winding $S_2$ constitutes with the diode D a protection circuit for limiting the overvoltages which arise from current interruptions in the thyristors.

Operation of the thyristor inverter hereinabove described is as follows: it will be noted in the first place that the cell which is constituted by the elements $C_1$, $C_2$, $T_1$, $T_2$, $P_1$, $L_1$, $C_5$ is identical with the cell which is constituted by the elements $C_3$, $C_4$, $T_3$, $T_4$, $P_2$, $L_2$, $C_6$. The final inverter therefore results from the series connection of these two identical cells to a single supply source E.

When a pulse of the drive signal 1 arrives at the control electrode of the thyristor $T_1$, this latter becomes conductive. The capacitor $C_1$ behaves as a voltage source, then delivers a current through the circuit $T_1 P_1 L_1 C_5$. This current passes through the series resonance circuit $L_1 C_5$ having the natural frequency $N/2$, first charges the capacitor $C_5$ to its peak voltage, then falls to zero after a half-wave having a time-duration $T/4$, then begins to reverse and blocks the thyristor $T_1$.

At the same instant, a pulse of the drive signal 2 arrives at the control electrode of the thyristor $T_2$ and triggers this latter into conduction. The capacitor $C_5$ which adds its voltage to that of the source constituted by the capacitor $C_2$ then discharges through the circuit $L_1 P_1 T_2$ while delivering one current half-wave through one-half of the primary winding $P_1$. Said current half-wave has the same direction as the half-wave previously produced through the other half of the primary winding $P_1$ and has the same time-duration $T/4$.

At the moment of current reversal, the thyristor $T_2$ is blocked while the thyristor $T_3$ is triggered into conduction under the action of a pulse of the drive signal 3, thereby initiating in the case of the cell constituted by the elements $C_3$, $C_4$, $T_3$, $T_4$, $P_2$, $L_2$, $C_6$ a further cycle of operation which is identical with the cycle just described in the case of the cell $C_1 C_2 T_1 T_2 P_1 L_1 C_5$. The cycle then starts again in the last cell, and so on in sequence.

There is finally obtained within the secondary winding $S_1$ of the output transformer $Tr$ a succession of signals having a period $T/4$ and therefore a frequency N. Inasmuch as said secondary winding is tuned to the frequency N by the capacitor C, the current which is applied to the load impedance Z has a sinusoidal waveform and a frequency N.

Each thyristor $T_1$, $T_2$, $T_3$ or $T_4$ of the inverter operates at a low frequency which is a submultiple of the output frequency N and which is equal to $N/4$ in this particular example of construction with four-phase excitation. In addition, each thyristor is supplied at a low voltage with respect to that of the source E, thereby making it possible in particular to supply the inverter directly from the mains current which is simply rectified. By virtue of this combination of arrangements, it is possible to obtain with a thyristor inverter in accordance with the invention a high output power at a high frequency. An inverter of this type therefore finds a particularly advantageous application as an ultrasonic generator or as an induction heating generator and, in general, each time high-frequency power is required.

It is naturally to be understood that each thyristor $T_1$, $T_2$, $T_3$ or $T_4$ could be replaced by a stage formed of a plurality of thyristors connected either in series or in parallel according to the conventional modes of assembly of thyristors. However, in this case, all of the thyristors which constitute the stage are excited in phase by a same drive signal.

It will also be readily understood that the circuit arrangement of FIG. 1 can easily be extrapolated for a higher number of excitation phases such as, for example, 6, 8, 10, and so forth. To this end, it is only necessary to add in series a number of cells of identical design to the cell which is, for example, constituted by the elements $C_1$, $C_2$, $T_1$, $T_2$, $P_1$, $L_1$ and $C_5$.

Figure 3:
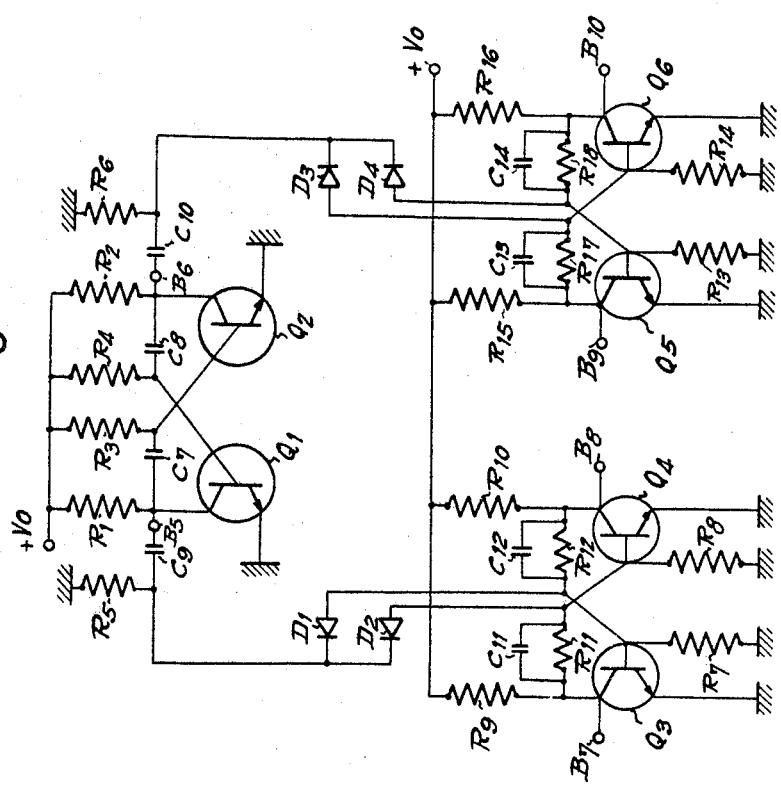
FIG. 3 is a diagram of one example of embodiment of the drive circuit of the inverter.

There will now be described one example of construction of the drive circuit G of FIG. 1, reference being made to the diagram of FIG. 3. Said drive circuit first comprises an astable multivibrator with symmetrical outputs which is essentially constituted by two n-p-n transistors $Q_1$ and $Q_2$. The diagram of said multivibrator is of a known type and will therefore not be described in detail. The two transistors $Q_1$ and $Q_2$ have grounded emitters and are biased by a direct-current voltage source $+V_0$ by means of collector resistors $R_1$ and $R_2$ and base resistors $R_3$ and $R_4$. The capacitors $C_7$ and $C_8$ are coupling capacitors, and the two symmetrical output signals developed by the multivibrator are collected at the terminals $B_5$ and $B_6$ which are connected to the collectors of the transistors.

The terminal $B_5$ is connected to a by-pass circuit constituted by a capacitor $C_9$ in series with a grounded resistor $R_5$. Similarly, the terminal $B_6$ is connected to a by-pass circuit comprising a capacitor $C_{10}$ and a resistor $R_6$. The point of junction of $C_9$ with $R_5$ is connected via two coupling diodes $D_1$ and $D_2$ to the inputs of a first symmetrical bistable device which is mounted as a scale-of-two frequency divider. The point of junction of $C_{10}$ with $R_6$ is connected via two coupling diodes $D_3$ and $D_4$ to the inputs of a second bistable device which is identical with the first. These two bistable devices are also of known type and will not be described in detail.

The first bistable device comprises two n-p-n transistors $Q_3$ and $Q_4$ with grounded emiters, two base resistors $R_7$ and $R_8$, two collector resistors $R_9$ and $R_{10}$ connected to the polarizing source $+V_0$, and two coupling capacitors $C_{11}$ and $C_{12}$ which are connected in shunt with resistors $R_{11}$ and $R_{12}$. Similarly, the second bistable device comprises two n-p-n transistors $Q_5$ and $Q_6$, two base resistors $R_{13}$ and $R_{14}$, two collector resistors $R_{15}$ and $R_{16}$, and two coupling capacitors $C_{13}$ and $C_{14}$ connected in shunt with resistors $R_{17}$ and $R_{18}$. The collectors of the four transistors $Q_3$, $Q_4$, $Q_5$ and $Q_6$ are also connected respectively to output terminals $B_7$, $B_8$, $B_9$ and $B_{10}$ at which the signals produced by said two bistable devices are collected.

Referring in particular to the diagram of signals of FIG. 4, the operation of the drive circuit will now be explained.

The astable multivibrator is tuned to the frequency $N/2$ and therefore delivers at its output terminals $B_5$ and $B_6$ two symmetrical square-wave signals having a frequency $N/2$ as shown respectively at 5 and 6 in FIG. 4. The signal 5 is taken from the shunt circuit $C_9$–$R_5$ and the negative pulses obtained drive the bases of the transistors $Q_3$ and $Q_4$ of the first bistable device via the coupling diodes $D_1$ and $D_2$. Similarly, the signal 6 is taken from the shunt circuit $C_{10}$–$R_6$ and the negative pulses obtained drive the bases of the transistors $Q_5$ and $Q_6$ of the second bistable device via the diodes $D_3$ and $D_4$.

The two bistable devices are mounted as scale-of-two frequency dividers and consequently deliver at their output terminals $B_7$, $B_8$, $B_9$ and $B_{10}$ four square-wave signals having a frequency $N/4$ which are respectively designated as 7, 8, 9 and 10 in FIG. 4. The signals 7 and 8 as well as the signals 9 and 10 are in opposite phase. Moreover, the midpoints of the horizontal tops of the signals 9 and 10 coincide with the vertical edges of the signals 7 and 8. These four signals 7, 8, 9 and 10 are therefore four-phased.

By means of conventional shunt circuits, the signals shown at 11, 12, 13 and 14 can readily be obtained from the square-wave signals 7, 8, 9 and 10. Said four signals which are formed of positive pulses corresponding to the leading edges of the square-wave signals are identical with the signals 1, 2, 3 and 4 of FIG. 2 and therefore constitute the four-phase drive signals which are applied to the control electrodes of the thyristors of FIG. 1.

In fact, the drive signals 11, 12, 13 and 14 are not applied directly to the control electrodes of the thyristors but by way of buffer stages which are coupled to the control electrodes via transformers with isolated secondary windings. These separating stages are of conventional type and have therefore not been shown in the drawings. However, the presence of stages is made necessary by the fact that the control electrodes of the four thyristors $T_1$, $T_2$, $T_3$ and $T_4$ are all at different potentials.

A drive circuit of this type is particularly well suited to the inverter according to the invention since it makes it possible to obtain a large number of polyphase signals in a very simple manner. In fact, after shunting, the signals 7, 8, 9 and 10 which are delivered by the two bistable devices can in turn drive four other identical bistable devices which then produce eight eight-phase signals having a frequency $N/8$. Said eight signals are intended to excite eight thyristors in eight-phase assembly so as to supply an output current having a frequency N.

The eight eight-phase signals can each be adapted in addition to drive a bistable device and there are accordingly obtained sixteen further polyphase drive signals having a frequency $N/16$ which are intended to excite sixteen thyristors. The process can be continued as many times as may be desired; the addition of a further stage of bistable devices has the effect of dividing the frequency by two while at the same time multiplying the number of phases by two. However, it should be pointed out that the drive circuits thus provided make it possible to obtain only a number of phases which is equal to a multiple of 4 in a geometrical progression having a common ratio of 2, that is to say, 8, 16, 32, and so forth.

If so required, the astable multivibrator having a frequency of $N/2$ can usefully be synchronized by an oscillator having the same frequency or a multiple frequency. Alternatively, said multivibrator can be replaced by a bistable device having symmetrical outputs which is in turn driven by a control oscillator having a frequency of $N/2$. The multivibrator can even be replaced by a scale-of-two bistable device which is identical with those hereinabove described, said device being driven by pulses having the frequency N which are delivered by a separate control oscillator.

It will in any case be apparent that the mode of execution of the invention hereinabove described has been given solely by way of example without any limitation being implied and that a large number of modifications can accordingly be contemplated without thereby departing from the scope of the invention.

What I claim is:

1. A thyristor inverter of the polyphase excitation type and comprising an output transformer at whose secondary winding is collected a signal having a frequency N, characterized in that said thyristor inverter comprises $p$ thyristor stages connected in series with the primary winding of the output transformer and each supplied from the same direct-current power source by means of a capacitive voltage divider having a division ratio equal to $p$, and a drive circuit which generates $p$ polyphase signals having a frequency $N/p$ and respectively applied to the control electrodes of the thyristors of each stage, said drive signals being in addition successively phase-shifted relative to each other by a quantity equal to $1/N$.

2. An inverter according to claim 1 wherein the number of stages of thyristors is equal to 4 or to a multiple of 4 in a geometrical progression having a common ratio of 2, characterized in that the drive circuit comprises a control stage which delivers two symmetrical square-wave signals having a frequency $N/2$ applied respectively to two scale-of-two bistable devices having symmetrical outputs, the four four-phase signals thus generated being in turn intended to drive four other identical bistable devices in sequence until the number of polyphase signals produced is equal to the number of stages of thyristors of the inverter.

3. An inverter according to claim 2, characterized in that the control stage is constituted by a symmetrical astable multivibrator having a frequency $N/2$.

4. An inverter according to claim 3, characterized in that the astable multivibrator is synchronized by a control oscillator having the same frequency or a multiple frequency.

5. An inverter according to claim 2, characterized in that the control stage is constituted by a bistable device having symmetrical outputs and driven by a control oscillator having a frequency $N/2$.

6. An inverter according to claim 2, characterized in that the control stage is constituted by a scale-of-two bistable device having symmetrical outputs and driven by the pulses of an oscillator having a frequency N.

References Cited

UNITED STATES PATENTS

| | | | |
|---|---|---|---|
| 3,226,625 | 12/1965 | Diebold | 34—27 |
| 3,259,831 | 7/1966 | Dortort | 321—27 XR |
| 3,267,290 | 8/1966 | Diebold. | |
| 3,302,093 | 1/1967 | Yarrow | 321—7 |
| 3,405,344 | 10/1968 | Boksjo et al. | 321—27 XR |
| 3,409,818 | 11/1968 | Gillett | 321—27 |

FOREIGN PATENTS 1,331,827  5/1963  France.

LEE T. HIX, Primary Examiner

W. M. SHOOP, Jr., Assistant Examiner

U.S. Cl. X.R.

321—27